J. P. F. Datichy,

Ejector.

No. 105,181. Patented July 12, 1870.

3 Sheets, Sheet 1.

Witnesses:
Gustave Dieterich
D. S. Mabee

Inventor:
J. P. F. Datichy
Per Munn & Co.
Attorneys.

J. F. F. Datichy,
Ejector.
No. 105,181. Patented July 12, 1870.

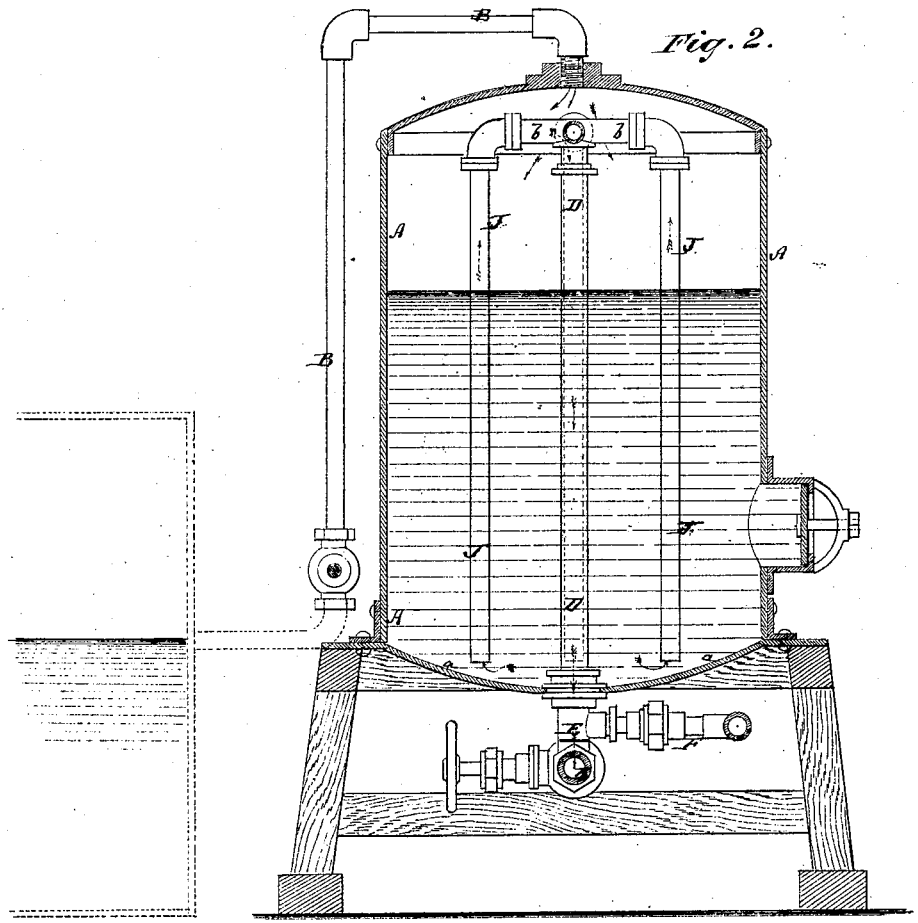

UNITED STATES PATENT OFFICE.

JEAN PIERRE FLORIMOND DATICHY, OF BROOKLYN, NEW YORK.

IMPROVEMENT IN INJECTORS FOR STEAM-BOILERS.

Specification forming part of Letters Patent No. 105,181, dated July 12, 1870.

*To all whom it may concern:*

Be it known that I, JEAN PIERRE FLORIMOND DATICHY, of Brooklyn, in the county of Kings and State of New York, have invented a new and Improved Injector for Steam-Boilers; and I do hereby declare that the following is a full, clear, and exact description thereof, which will enable others skilled in the art to make and use the same, reference being had to the accompanying drawing, forming part of this specification.

Figure 1:
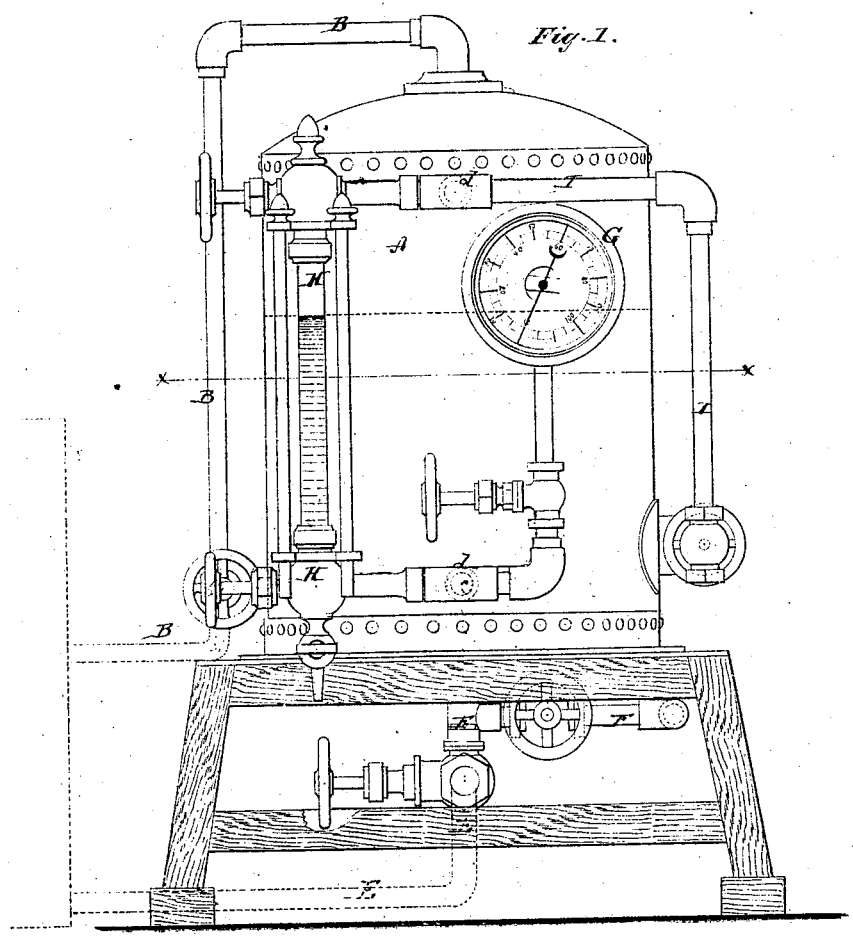
Figure 3:
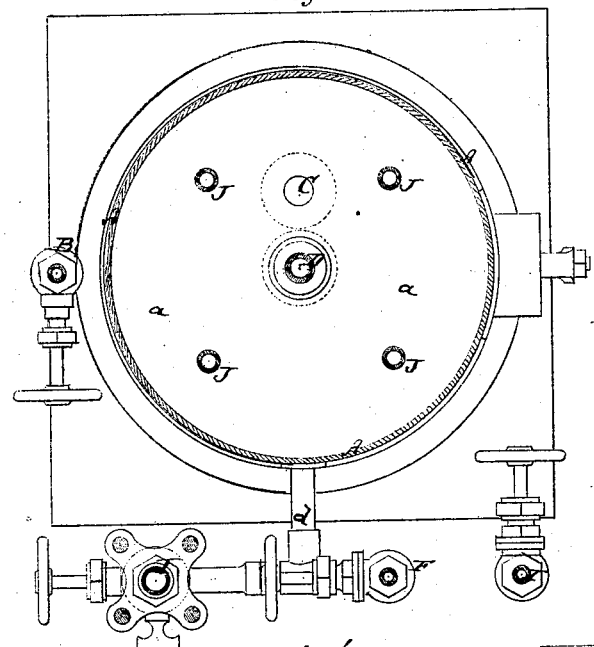
Figure 4:
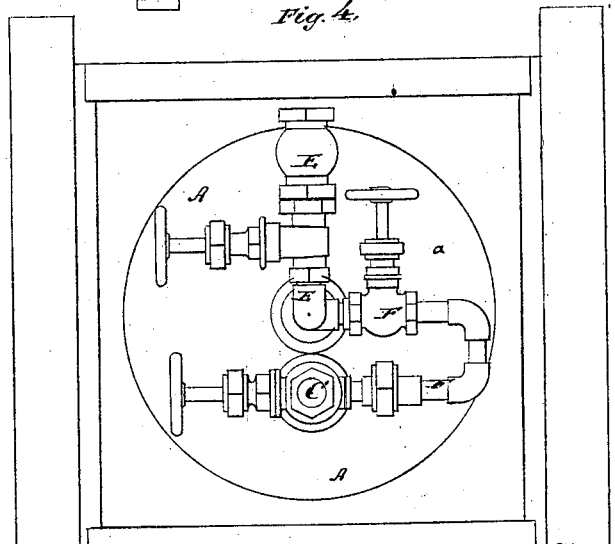

Figure 1 represents a front elevation of my improved steam-injector. Fig. 2 is a vertical central section of the same. Fig. 3 is a horizontal section of the same, taken on the plane of the line X X, Fig. 1. Fig. 4 is an inverted plan view of the same.

Similar letters of reference indicate corresponding parts.

This invention has for its object improvement in self-acting feed apparatus for steam-boilers, and is arranged to supply water that is heated to a very high degree of temperature.

The invention consists in the combination and arrangement of parts, as hereinafter described.

A in the drawing represents a vessel of cylindrical or other suitable form, horizontal or vertical, of suitable shape, and made of strong boiler-iron or other suitable metal, so as to withstand steam-pressure in the same degree in which the boiler with which it is connected does withstand the pressure.

B is a steam-pipe, which connects the boiler with the upper part of the vessel A. C is a water-supply pipe entering the lower end of the vessel A. It serves to supply the water from a suitable reservoir to the said vessel.

From the bottom *a* of the vessel A projects a vertical central pipe, D, nearly to the top of the said vessel. The upper end of the pipe D is, by means of horizontal branches *b b*, connected with four, more or less, vertical pipes, J J, which reach, with their open lower ends, nearly to the bottom *a*. The lower end of the pipe D is, by means of a pipe and valve, E, connected with the lower part of the boiler. The two pipes C and E are, below the vessel A, connected with each other by means of a curved pipe, F.

From the side of the vessel A project pipes *d d*, which communicate with a pressure-gage, G, and indicator H, and with a pipe, I, for the escape of air from the upper part of the vessel A. Each of the pipes employed in this apparatus is provided with a suitable stop-cock. The injector should be placed more or less above the level of the boiler.

The operation is as follows: Water is introduced into the vessel A either by pressure, where there is a head of water, or by suction. In case pressure is available, the pipe C is to be opened, so that the water will enter the vessel A, while the pipe I is also kept open to let the air escape. The pipe I is closed when the vessel is sufficiently full—that is to say, when the water is up to about within six inches of the top of the vessel A—which will be shown by the indicator H. The pipe C is then also closed. A vacuum is obtained by opening the pipe B and introducing a sufficient quantity of steam into the vessel A, and by then closing said pipe B and opening pipe C, through which the steam will come in contact with the cold water in the well or reservoir, condensing thereby and forming a vacuum. Water will then be rapidly drawn up from a depth of thirty feet. When the requisite quantity of water is received in the vessel A the pipe C is closed.

To feed the boiler the pipe B is but slightly opened to let steam into the upper part of the vessel A, and when the steam-gage indicates the same amount of pressure as in the boiler the pipe E is opened, and the steam, forming a cushion, presses upon the water and forces the same up into the pipes J J, thence down through D and valve and pipe E into the boiler. By contact with the pressure-steam the water in the cylinder is considerably heated, and, moreover, as fast as it passes through the pipes J and D the parts of these pipes which are left uncovered by the falling of the level water become also very hot, so that the heat of the water increases still more in its subsequent passage through said pipes. The water will thus reach the boiler at a very high degree of temperature.

In order to prevent the steam which may enter the lower part of the pipe E from the boiler from counterbalancing the upper pressure of steam in the vessel A, which it is clear would prevent the proper flow of the water, I have arranged the curved connection F between the pipes C and E. This connection is, at the commencement of the operation, and only then, slightly opened, to throw a small jet of cold water on the steam in E, condensing the same and allowing the water to flow rapidly into the boiler. The pipes $d\ d$ convey water and steam to the indicator H and steam-gage G, to enable the attendant to understand the exact position of affairs in the said vessel. When the water is low in the boiler the steam will act with greater force within the injector to rapidly supply the demand. When the water in the boiler is high enough to close the end of the pipe B no steam will escape to the injector. The exact supply is, however, best regulated by the stop-cocks in the several pipes.

The vessel apparatus is entirely separated from the boiler by the stop-cocks when the boiler contains a sufficient amount of water.

By using the steam to heat the feed-water fuel is economized and the most common cause of explosions is prevented.

Having thus described my invention, I claim as new and desire to secure by Letters Patent—

1. The combination and arrangement of the supply-pipe C, air-escape I, pipe B, pipes J D, and pipe E with the vessel A, substantially as and for the purpose specified.

2. The reservoir or vessel A, combined with the steam-pipe B and water-pipes J D E, all arranged to operate as set forth.

3. The connecting-pipe F, arranged between the pipes C and E, for the purpose of condensing the steam that may be in the pipe E, as set forth.

The above specification of my invention signed by me this 27th day of April, 1870.

J. P. F. DATICHY.

Witnesses:
 P. A. PERRIN,
 A. V. BRIESEN.